(12) United States Patent
Nakamura et al.

(10) Patent No.: US 7,923,116 B2
(45) Date of Patent: *Apr. 12, 2011

(54) OPTIC-PURPOSE PRECURSOR COMPOSITION, OPTIC-PURPOSE RESIN, OPTICAL ELEMENT, AND OPTICAL ARTICLE

(75) Inventors: Toru Nakamura, Kawasaki (JP); Akiko Miyakawa, Sagamihara (JP)

(73) Assignee: Nikon Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/495,757

(22) Filed: Jun. 30, 2009

(65) Prior Publication Data

US 2010/0060986 A1    Mar. 11, 2010

Related U.S. Application Data

(63) Continuation of application No. 10/497,083, filed as application No. PCT/JP02/12602 on Dec. 2, 2002, now Pat. No. 7,553,544.

(30) Foreign Application Priority Data

Nov. 30, 2001 (JP) ................................. 2001-365559
Mar. 25, 2002 (JP) ................................. 2002-083990

(51) Int. Cl.
    *B32B 27/40*    (2006.01)
(52) U.S. Cl. .................................................. 428/442
(58) Field of Classification Search .................. 428/442
    See application file for complete search history.

(56) References Cited

U.S. PATENT DOCUMENTS

| 5,847,877 | A | 12/1998 | Imamura et al. ............... 359/566 |
| 5,886,828 | A | 3/1999 | Kim |
| 6,166,125 | A | 12/2000 | Sugiyama et al. |
| 7,553,544 | B2 * | 6/2009 | Nakamura et al. ............ 428/442 |
| 2001/0055157 | A1 | 12/2001 | Shirasuna |

FOREIGN PATENT DOCUMENTS

| CN | 1213677 A | 4/1999 |
| JP | 58-018601 | 2/1983 |
| JP | 01-108247 | 4/1989 |
| JP | 06-011607 | 1/1994 |
| JP | 06-049152 | 2/1994 |
| JP | 09-127321 | 5/1997 |
| JP | 2001-235608 | 8/2001 |
| JP | 2001-305305 | * 10/2001 |
| JP | 2001-305429 | 10/2001 |

OTHER PUBLICATIONS

Notice of Second Office Action in Chinese Patent Application No. 200810144119.0 and English translation thereof.

* cited by examiner

*Primary Examiner* — Robert D. Harlan
(74) *Attorney, Agent, or Firm* — Morgan, Lewis & Bockius LLP (57) ABSTRACT

The optical element of the present invention has a first member and a second member which have been joined in close contact, and has $n_{d1} > n_{d2}$ and $(n_{F1} - n_{C1}) < (n_{F2} - n_{C2})$, where the first member is formed of a resin having both a benzene ring and a fluorine atom, or the second member is formed of a resin having an alicyclic structure. It also makes use of an optic-purpose resin precursor composition prepared by mixing a first resin precursor having $n_d < 1.50$ and $(n_F - n_C) > 0.003$ in an uncured state and a second resin precursor having $n_d < 1.62$ and $(n_F - n_C) > 0.010$.

8 Claims, 3 Drawing Sheets

OPTIC-PURPOSE PRECURSOR COMPOSITION, OPTIC-PURPOSE RESIN, OPTICAL ELEMENT, AND OPTICAL ARTICLE

This application is a Continuation Application of U.S. patent application Ser. No. 10/497,083, filed May 28, 2004, now U.S. Pat. No. 7,553,544 which is a U.S. National Phase Application of International Application No. PCT/JP02/12602, filed Dec. 2, 2002, which claims the benefit of Japanese Patent Application No. 2001-365559, filed Nov. 30, 2001 and Japanese Patent Application No. 2002-083990, filed Mar. 25, 2002, all of which are hereby incorporated by reference in their entireties.

TECHNICAL FIELD

This invention relates to a close-contact double-layer type diffractive optical element and a method for its production, and to an optical article having this element, and an optic-purpose resin precursor composition and an optic-purpose resin which are used in the element.

BACKGROUND ART

In recent years, a technique has been developed in which chromatic aberration is corrected using a diffractive optical element in an imaging optical system, and optical materials having a low refractive index and a high dispersion which are favorable for use in it attract notice. For example, in a close-contact double-layer type diffractive optical element consisting of two layers having different optical characteristics, as proposed in Japanese Patent Laid-open Publication No. H9-127321, an optical material having a low refractive index and a high dispersion is used in one of layers constituting the element.

However, it is known that optical materials have a positive correlation between the refractive index and the dispersion. Materials having a low refractive index has a small dispersion, and conversely materials having a high refractive index has a large dispersion. Hence, optical materials having a high dispersion though having a low refractive index are very limited. In fact, materials disclosed in the above publication are almost inorganic materials, and just only polycarbonates are disclosed as organic materials.

Accordingly, inorganic matter, in particular, a glass is usually used as an optical material in such a close-contact double-layer type diffractive optical element. For example, in Japanese Patent Laid-open Publication No. 2001-235608, a method is disclosed in which a close-contact double-layer type diffractive optical element is produced using a low-melting glass.

However, in general, inorganic materials are inferior to organic materials in respect of workability and moldability, and also it is not easy to bring inorganic optical materials into perfect close contact with each other. In addition, glass materials are necessarily limited and moreover required to have heat resistance because they are molded at a high temperature. Hence, materials for molds are also limited. Also, because of a high viscosity of glass materials at the time of molding, it has been difficult to materialize sufficient transfer properties.

DISCLOSURE OF THE INVENTION

Accordingly, an object of the present invention is to provide a close-contact double-layer type diffractive optical element which can be produced with ease and simply in a good precision, a method for its production, an optical article having such an element, an optic-purpose resin precursor composition favorable as a material for the element, and an optic-purpose resin which is a cured product of the composition.

To achieve the above object, first invention in the present application provides an optic-purpose resin precursor composition obtained by mixing at least:

(1) a first resin precursor having a d-line refractive index $n_d$ of less than 1.50 in an uncured state, and having in an uncured state a difference (average dispersion MD) of larger than 0.003 which is found by subtracting a C-line refractive index $n_C$ from an F-line refractive index $n_F$; and (2) a second resin precursor having a d-line refractive index $n_d$ of less than 1.62 in an uncured state, and having in an uncured state a difference (average dispersion MD) of larger than 0.010 which is found by subtracting a C-line refractive index $n_c$ from an F-line refractive index $n_F$.

Incidentally, in the present specification, the resin is meant to be an organic high-molecular compound. Also, in the present invention, the resin precursor may as well be any of monomers, oligomers, prepolymers, polymers and so forth as long as resins are obtainable by curing.

In the optic-purpose resin precursor composition of the present invention, the first resin precursor does not contain any of a benzene ring, a sulfur atom, a chlorine atom, a bromine atom and an iodine atom, has at least one of any of an acrylic group, a methacrylic group and a vinyl group, and the second resin precursor does not contain any of a sulfur atom and a halogen atom, and has at least one of any of an acrylic group, a methacrylic group and a vinyl group. Otherwise, the first resin precursor is represented by the following compositional formula (1) and has at least one polymerizable functional group in the molecule, and the second resin precursor is represented by the following compositional formula (2) and has at least one polymerizable functional group in the molecule and at least one benzene ring in the molecule.

$$C_{m1}H_{n1}O_{p1}N_{q1}F_{r1} \tag{1}$$

wherein m1 and n1 are each an integer of 5 or more, p1 and q1 are each an integer of 0 or 1 or more and m1 or less, and r1 is an integer of 0 or 1 or more and (n1×2) or less.

$$C_{s1}H_{t1}O_{u1}N_{v1} \tag{2}$$

wherein s1 and t1 are each an integer of 5 or more, and u1 and v1 are each an integer of 0 or 1 or more and s1 or less.

The present invention further provides an optic-purpose resin obtained by curing the above optic-purpose resin precursor composition of the present invention, an optical element comprising a first member formed of such a resin, and an optical article having this optical element of the present invention.

Second invention in the present application provides a diffractive optical element which is a close-contact double-layer type diffractive optical element having a second member formed of a first resin and a first member formed of a second resin, joined to the second member in close contact, where the second member has a d-line refractive index $n_{d1}$ which is larger than a d-line refractive index $n_{d2}$ of the first member, and the second member has an average dispersion $MD_1$ (that is, a difference found by subtracting a C-line refractive index $n_{C1}$ of the second member from an F-line refractive index $n_{F1}$ of the second member) which is smaller than an average dispersion $MD_2$ (that is, a difference found by subtracting a C-line refractive index $n_{C2}$ of the first member from an F-line refractive index $n_{F2}$ of the first member) of the first member;

(1) the first resin having an alicyclic structure in the repeating unit; and/or (2) the second resin having both a benzene ring and a fluorine atom in the repeating unit; and provide an optical article having this close-contact double-layer type diffractive optical element of the present invention.

The present invention also provides a method for producing a close-contact double-layer type diffractive optical element, which is a method for producing a close-contact double-layer type diffractive optical element having a second member formed of a first resin and a first member formed of a second resin, joined to the second member in close contact; the method having the step of molding a composition containing a precursor of the first resin (that is, a fourth resin precursor) and curing the composition to form the second member; the first resin having an alicyclic structure in the repeating unit; and (d-line refractive index $n_{d1}$ of first resin)>(d-line refractive index $n_{d2}$ of second resin); and (average dispersion $MD_1$ of first resin)<(average dispersion $MD_2$ of second resin).

The present invention further provides a method for producing a close-contact double-layer type diffractive optical element, which is a method for producing a close-contact double-layer type diffractive optical element having a second member formed of a first resin and a first member formed of a second resin, joined to the second member in close contact; the method having the step of molding a composition containing a precursor of the second resin (that is, a third resin precursor) and curing the composition to form the first member; and (d-line refractive index $n_{d1}$ of first resin)>(d-line refractive index $n_{d2}$ of second resin); and (average dispersion $MD_1$ of first resin)<(average dispersion $MD_2$ of second resin).

Incidentally, here;

(average dispersion $MD_1$ of first resin)=(F-line refractive index $n_{F1}$ of first resin)−(C-line refractive index $n_{C1}$ of first resin); and (average dispersion $MD_2$ of second resin)=(F-line refractive index $n_{F2}$ of second resin)−(C-line refractive index $n_{C2}$ of second resin).

Incidentally, the optic-purpose resin precursor composition of the invention in the present application may further contain a third resin precursor (that is, a precursor of the second resin) in addition to the above first resin precursor and second resin precursor. The cured product of the optic-purpose resin precursor composition containing the first resin precursor and second resin precursor may also be the second resin.

BEST MODES FOR PRACTICING THE INVENTION

Conventionally, optical materials having a low refractive index and a high dispersion have been very limited. Accordingly, the present inventors have made extensive studies so that materials superior in workability, molderability, adherence and transfer properties can freely be selected. As the result, they have reached a new finding that the desired optical characteristics can be obtained by mixing a component having a low refractive index and a component having a high dispersion as long as components having specific characteristics are used, and have accomplished the invention in the present application.

In the first invention in the present application, a first component (first resin precursor) having a low refractive index and a second component (second resin precursor) having a high dispersion are mixed to materialize a resin having a high dispersion though having a low refractive index. More specifically, the optic-purpose resin precursor composition of the first invention in the present application comprises a first resin precursor having a d-line refractive index $n_d$<1.50 and a dispersion $(n_F-n_C)$>0.003 in an uncured state, and a second resin precursor having a d-line refractive index $n_d$<1.62 and a dispersion $(n_F-n_C)$>0.010 in an uncured state. Incidentally, these resins may as well be present alone for each, or stand copolymerized.

The first resin precursor is required to have a low d-line refractive index ($n_d$<1.50) and also a some high dispersion [$(n_F-n_C)$>0.003]. Such a resin may preferably not contain a benzene ring, a sulfur atom and halogen atoms other than fluorine (a chlorine atom, a bromine atom and an iodine atom), which may give a high refractive index.

Incidentally, the fluorine has the action to lower the refractive index, and hence a compound containing fluorine may as well be used as the first resin precursor. However, the fluorine may preferably be in a content twice or less the total number of hydrogen atoms in the molecule. If fluorine atoms are more than this, the resin obtained finally by curing the resin precursor composition in which the second component has been mixed may have too low dispersion. Also, if fluorine atoms are too many, a low compatibility with the second component may result, so that the resin precursor composition and the resin, a cured product of the former, may come milky-white. This first resin precursor may preferably have ultraviolet curability or heat curability, and, in order to materialize this, may preferably contain a polymerizable functional group such as an acrylic group, a methacrylic group or a vinyl group. Incidentally, this functional group may be alone in the molecule, or present in plurality.

As such a first resin precursor, a compound may be used which is represented by the following compositional formula (1), having at least one polymerizable functional group in the molecule.

$$C_{m1}H_{n1}O_{p1}N_{q1}F_{r1} \tag{1}$$

wherein m1 and n1 are each an integer of 5 or more, p1 and q1 are each an integer of 0 or 1 or more and m1 or less, and r1 is an integer of 0 or 1 or more and (n1×2) or less. Stated specifically, the first resin precursor may preferably be a compound represented by any of the following general formulas (3) to (9).

Here, $R^1$, $R^3$, $R^5$, $R^7$, $R^{12}$ and $R^{17}$ are each a hydrogen atom or a methyl group; $R^2$, $R^4$ and $R^6$ are each a monovalent organic group; $R^8$ is a divalent organic group; $R^9$ to $R^{11}$ are each a monovalent organic group having an acrylic group or a methacrylic group; $R^{13}$, $R^{14}$ and $R^{28}$ are each a divalent organic group; $R^{15}$, $R^{18}$ and $R^{29}$ are each a monovalent organic group; a, d and f are each a number of 2 or more to 4 or less; and b, e and g are each a number of 1 or more.

Incidentally, $R^2$, $R^4$, and $R^8$ and $R^6$ may each preferably be an organic group represented by the compositional formula: $C_{m2}H_{n2}O_{p2}N_{q2}F_{r2}$ (where m2 is an integer of 1 or more, p2 and q2 are each an integer of 0 or more, n2 is an integer of 1 or more, and r2 is an integer of 0 or [(n2+5)×2] or less and 1 or more), and $R^9$ to $R^{11}$, $R^{13}$ to $R^{16}$, $R^{18}$ and $R^{19}$ may each preferably be made up of C, H and O.

Compounds favorable for the first invention in the present application as this first resin precursor may include, e.g., as the compound represented by the formula (3), 2,2,2-trifluoroethyl methacrylate, 2,2,2-trifluoroethyl acrylate, β-(perfluoroethyl)ethyl methacrylate, β-(perfluoroethyl)ethyl acrylate, 1,1,1,3,3,3,-hexafluoroisopropyl methacrylate, 1,1,1,3,3,3,-hexafluoroisopropyl acrylate, 2,2,2-trifluoroethyl methacrylate, 2,2,2-trifluoroethyl acrylate, 2,2,3,3-tetrafluoropropyl methacrylate, 2,2,3,3-tetrafluoropropyl methacrylate, 2,2,3,4,4,4-hexafluorobutyl methacrylate, 2,2,3,4,4,4-hexafluorobutyl methacrylate, octafluoropentyl methacrylate, octafluoropentyl acrylate, methyl methacrylate, methyl acrylate, ethyl acrylate, butyl methacrylate, butyl acrylate, isodecyl methacrylate, isodecyl acrylate, lauryl methacrylate, lauryl acrylate, tridecyl methacrylate, tridecyl acrylate, cetyl methacrylate, cetyl acrylate, stearyl methacrylate, stearyl acrylate, tert-butylmethacrylate, tert-butyl acrylate, 2-ethylhexyl methacrylate, 2-ethylhexyl acrylate, 2-hydroxybutyl acrylate, 2-hydroxybutyl methacrylate, 2-hydroxyethyl acrylate, 2-hydroxyethyl methacrylate, 2-hydroxypropyl acrylate, 2-hydroxypropyl methacrylate, 3-methoxybutyl acrylate, diethylaminoethyl methacrylate and diethylaminoethyl acrylate.

The compound represented by the formula (4) which is favorable for the first invention in the present application may include 2-ethyl 2-butyl-propanediol methacrylate, 2-ethyl 2-butyl-propanediol acrylate, 1,3-butyleneglycol dimethacrylate, 1,3-butyleneglycol diacrylate, 1,6-hexanediol dimethacrylate, 1,6-hexanediol diacrylate, 1,9-nonanediol dimethacrylate, 1,9-nonanediol diacrylate, 1,10-decanediol dimethacrylate, 1,10-decanediol diacrylate, neopentyl glycol dimethacrylate, neopentyl glycol diacrylate, dipropyleneglycol dimethacrylate, dipropyleneglycol diacrylate and glycerol dimethacrylate.

The compound represented by the formula (5) which is favorable for the first invention in the present application may include dimethylaminoethyl methacrylate, 2-ethylhexylcarbitol methacrylate, 2-ethylhexylcarbitol acrylate, butoxyethyl methacrylate, butoxyethyl acrylate, ethoxydiethyleneglycol methacrylate, ethoxydiethyleneglycol acrylate, lauroxypolyethyleneglycol methacrylate, lauroxypolyethyleneglycol acrylate, polyethyleneglycol methacrylate (a=2, b=2 to 12), polyethyleneglycol acrylate (a=2, b=2 to 12), polypropyleneglycol methacrylate (a=3, b=2 to 20), allyloxypolyethyleneglycol methacrylate, allyloxypolyethyleneglycol acrylate, stearoxypolyethyleneglycol methacrylate, stearoxypolyethyleneglycol acrylate, octoxypolyethyleneglycol-polypropyleneglycol acrylate (a=2:4, b=14, the number of ethylene groups in one molecule: 8, the number of propylene groups in one molecule: 6), octoxypolyethyleneglycol-polypropyleneglycol methacrylate (a=2.4, b=14, the number of ethylene groups in one molecule: 8, the number of propylene groups in one molecule: 6), poly(propyleneglycol-tetramethyleneglycol) acrylate, poly(propyleneglycol-tetramethyleneglycol) methacrylate, poly(ethyleneglycol-tetramethyleneglycol) acrylate, poly(ethyleneglycol-tetramethyleneglycol) methacrylate, poly(ethyleneglycol-propyleneglycol) acrylate, poly(ethyleneglycol-propyleneglycol) methacrylate, polypropyleneglycol acrylate and methoxypolyethyleneglycol methacrylate.

The compound represented by the formula (6) which is favorable for the first invention in the present application may include ethylene oxide modified neopentylglycol dimethacrylate ($R^7$=methyl; d=f=2; e=g=an integer of 1 or more; $R^8$=$C_5H_{10}$) and propylene oxide modified neopentyl glycol diacrylate ($R^7$=a hydrogen atom; d=f=3; e=g=an integer of 1 or more; $R^8$=$C_5H_{10}$).

The compound represented by the formula (7) which is favorable for the first invention in the present application may include tris(acryloxyethyl) isocyanurate ($R^9$, $R^{10}$ and $R^{11}$ are all $CH_2CH_2OCOCH=CH_2$) and tris(methacryloxyethyl) isocyanurate ($R^9$, $R^{10}$ and $R^{11}$ are all $CH_2CH_2OCOC(CH_3)=CH_2$).

The compound represented by the formula (8) which is favorable for the first invention in the present application may include epichlorohydrin modified glycerol triacrylate ($R^{12}$ and $R^{15}$ are hydrogen atoms, $R^{13}$ is —$OCH_2CH(OH)CH_2$—, $R^{14}$ and $R^{16}$ are each —$CH_2OCH_2CH(OH)CH_2$—), ethylene oxide modified glycerol triacrylate ($R^{12}$ and $R^{15}$ are hydrogen atoms, $R^{13}$ is —$(C_2H_4O)_{j1}$—, $R^{14}$ and $R^{16}$ are each —$CH_2(C_2H_4O)_{j1}$—, where j1 is an integer of 1 or more), propylene oxide modified glycerol triacrylate ($R^{12}$ and $R^{15}$ are hydrogen atoms, $R^{13}$ is —$(C_3H_6O)$ $R^{14}$ and $R^{16}$ are each —$CH_2(C_3H_6O)_{j1}$—, where j1 is an integer of 1 or more), caprolactone modified trimethylolpropane triacrylate ($R^{12}$ is a hydrogen atom, $R^{13}$ is —$(C_5H_{12}COO)_{j1}$—, $R^{14}$ and $R^{16}$ are each —$CH_2(C_3H_6O)_{j1}$—, $R^{15}$ is an ethyl group, where j1 is an integer of 1 or more), ethylene oxide modified trimethylolpropane triacrylate ($R^{12}$ is a hydrogen atom, $R^{13}$ is —$(C_2H_4O)_{j2}$—, $R^{14}$ and $R^{16}$ are each —$CH_2(C_2H_4O)_{j2}$—, $R^{15}$ is an ethyl group, where j2 is an integer), and propylene oxide modified trimethylolpropane triacrylate ($R^{12}$ is a hydrogen atom, $R^{13}$ is —$(C_3H_6O)_{j2}$—, $R^{14}$ and $R^{16}$ are each —$CH_2$ $(C_3H_6O)_{j2}$—, $R^{15}$ is an ethyl group, where j2 is an integer).

In the compound of the formula (8) which is favorable for the first invention in the present application, a compound wherein $R^{14}$ and $R^{16}$ are methylene groups —$CH_2$— may also include pentaerythritol triacrylate, trimethylolpropane triacrylate, trimethylolpropane trimethacrylate, and pentaerythritol tetraacrylate.

Further, the compound represented by the formula (9) which is favorable for the first invention in the present application may include dipentaerythritol hydroxypentaacrylate, ($R^{17}$ is a hydrogen atom, $R^{18}$ is —$CH_2OH$, $R^{19}$ is —$CH_2OCOCH=CH$), and ditrimethylrolpropane tetraacrylate, ($R^{17}$ is a hydrogen atom, $R^{18}$ and $R^{19}$ are each an ethyl group).

Besides these, hydroxypivalic acid neopentylglycol diacrylate, isostearyl monoacrylate, isostearyl monomethacrylate, vinyl p-tert-butyl benzoate and methoxyethyl methacrylate are also favorable as the first resin precursor in the first invention in the present application.

Incidentally, of these first resin precursors, only a single compound may be used, or two or more compounds may as well be used in combination.

In order to materialize the high dispersion and low refractive index in the resin precursor obtained by mixing the first and second resin precursors, and the cured product thereof, the second resin precursor must have high dispersion ($n_F$−$n_C$>0.010) and also low refractive index (nd<1.62).

This second resin precursor, in order to materialize the high dispersion without making the refractive index high as far as possible, may preferably not contain the factor that makes the refractive index high, such as a sulfur molecule or a halogen atom. Also, in order to materialize the high dispersion, it may preferably contain a ring structure such as a benzene ring in the molecule. The ring structure may be a ring consisting of only a single bond (σ-bond), but may preferably be a ring having a π-bond as in a benzene ring because much higher dispersion characteristics can be obtained. Like the first resin precursor, this second resin precursor may also preferably have a polymerizable functional group such as an acrylic group or a methacrylic group or a vinyl group in the molecule, in order to materialize the property of being polymerizable by light, heat or the like.

As such a second resin precursor, a compound may be used which is represented by the following compositional formula (2) and has at least one polymerizable functional group in the molecule and at least one benzene ring in the molecule.

$$C_{s1}H_{t1}O_{u1}N_{v1} \qquad (2)$$

wherein s1 and t1 are each an integer of 5 or more, and u1 and v1 are each an integer of 0 or 1 or more and s1 or less.

This second resin precursor may include acrylate or methacrylate having a bisphenol-A structure, other acrylate or methacrylate having a benzene ring, and styrene. Stated specifically, it may preferably be a compound represented by any of the following general formulas (10) to (12).

Here, $R^{20}$ and $R^{22}$ are each a hydrogen atom or a methyl group, $R^{21}$ and $R^{23}$ are each a divalent organic group, $Z^1$ is a divalent organic group having at least one ring structure, $Z^2$ is a trivalent organic group, and h and i are each an integer. Incidentally, $R^{21}$ and $R^{23}$ may preferably consists of C, H and O, $Z^1$ may preferably an organic group represented by any of the following general formulas (13) to (15), and $Z^2$ may preferably an organic group represented by the following general formula (16).

(14)

(15)

(16)

Compounds favorable for the first invention in the present application as this second resin precursor may include, e.g., as the compound represented by the formula (10), ethylene oxide modified bisphenol-A diacrylate ($R^{20}$ is a hydrogen atom, $R^{21}$ is —$(OCH_2CH_2)_{k1}$—, $R^{22}$ is a methyl group, $R^{23}$ is —$(OCH_2CH_2)_{k2}$—, where k1 and k2 are integers), ethylene oxide modified bisphenol-A dimethacrylate ($R^{20}$ is a methyl group, $R^{21}$ is —$(OCH_2CH_2)_{k1}$—, $R^{22}$ is a methyl group, $R^{23}$ is —$(OCH_2CH_2)_{k2}$—, where k1 and k2 are integers), propylene oxide modified bisphenol-A diacrylate ($R^{20}$ is a hydrogen atom, $R^{21}$ is —$(OCH_2CH_2)_{k1}$—, $R^{22}$ is a methyl group, $R^{23}$ is —$(OCH_2CH_2CH_2)_{k2}$—, where k1 and k2 are integers), propylene oxide modified bisphenol-A dimethacrylate ($R^{20}$ and $R^{22}$ are methyl groups, $R^{21}$ is —$(OCH_2CH_2CH_2)_{k1}$—, $R^{23}$ is —$(OCH_2CH_2CH_2)_{k2}$—, where k1 and k2 are integers), ethylene oxide modified bisphenol-F diacrylate ($R^{20}$ and $R^{22}$ are hydrogen atoms, $R^{21}$ is —$(OCH_2CH_2)_{k1}$—, $R^{23}$ is —$(OCH_2CH_2)_{k2}$—, where k1 and k2 are integers), ethylene oxide modified bisphenol-F dimethacrylate ($R^{20}$ is a methyl group, $R^{21}$ is —$(OCH_2CH_2)_{k1}$—, $R^{22}$ is a hydrogen atom, $R^{23}$ is —$(OCH_2CH_2)_{k2}$—, where k1 and k2 are integers), propylene oxide modified bisphenol-F diacrylate ($R^{20}$ and $R^{22}$ are hydrogen atoms, $R^{21}$ is —$(OCH_2CH_2CH_2)_{k1}$—, $R^{23}$ is —$(OCH_2CH_2CH_2)_{k2}$—, where k1 and k2 are integers), propylene oxide modified bisphenol-A diacrylate ($R^{20}$ is a hydrogen atom, $R^{21}$ is —$(OCH_2CH_2CH_2)_{k1}$—, $R^{22}$ is a hydrogen atom, $R^{23}$ is —$(OCH_2CH_2CH_2)_{k2}$—, where k1 and k2 are integers), ethylene oxide-propylene oxide modified bisphenol-A diacrylate ($R^{20}$ is a hydrogen atom, $R^{21}$ is —$(OCH_2CH_2)_{k1}$—$(OCH_2CH_2CH_2)_{k2}$—, $R^{22}$ is a methyl group, $R^{23}$ is —$(OCH_2CH_2)_{k3}$—$(OCH_2CH_2CH_2)_{k4}$, where k1 to k4 are integers), and ethylene oxide-propylene oxide modified bisphenol-A dimethacrylate ($R^{20}$ and $R^{22}$ are methyl groups, $R^{21}$ is $OCH_2CH_2)_{k1}$—$(OCH_2CH_2CH_2)_{k2}$—, $R^{23}$ is —$(OCH_2CH_2)_{k3}$—$(OCH_2CH_2CH_2)_{k4}$, where k1 to k4 are integers).

The compound represented by the formula (11) which is favorable for the first invention in the present application may include
[5,5'-(9H-fluoren-9-ylidene)bis{(1,1'-biphenyl)-2-poly(oxy-2,1-ethanediyl)}]2-propenoate, in which the $Z^1$ group is represented by the formula (13);
[5,5'-{4-(1,1'-biphenyl)methylene}bis{(1,1'-biphenyl)-2-poly(oxy-2,1-ethanediyl)}]2-propenoate, in which the $Z^1$ group is represented by the formula (14); and
[(1-phenylethylidene)bis{(4,1-phenylenepoly(oxy-2,1-ethanediyl)}]2-propenoate, in which the $Z^1$ group is represented by the formula (15).

As the compound represented by the formula (12), e.g., 1,1-bis(p-acryloyloxyethyloxyphenyl)-1-[p'-{1'-(p'-acryloyloxyethyloxy)phenyl-1'-methylethyl}phenyl]ethane, in which the $Z^2$ group is represented by the formula (16) is favorable for the first invention in the present application.

Besides these, also favorable for the first invention in the present application as the second resin precursor are 2,2-bis[4-(methacryloxyethoxy)phenyl]propane, 2,2-bis[4-(methacryloxydiethoxy)phenyl]propane, 2,2-bis[4-(methacryloxypolyethoxy)phenyl]propane, 2,2-bis[4-(acryloxydiethoxy)phenyl]propane, phnoxyethyl acrylate, phnoxydiethyleneglycol acrylate, phnoxypolyethyleneglycol acrylate, 2-hydroxy-3-phenoxypropyl acrylate, and so forth.

Incidentally, of these second resin precursors, only a single compound may be used, or two or more compounds may as well be used in combination.

The resin precursor composition of the first invention in the present application may appropriately contain, in addition to the first and second resin precursors described above, a fifth resin precursor, a polymerization initiator and so forth for the purpose of viscosity modification or the like. As a polymerization initiator favorable for the resin precursor composition of the first invention in the present application, it may include, e.g., photopolymerization initiators such as benzophenone, hydroxybenzophenone methanesulfonate, o-benzoylmethyl benzoate, p-chlorobenzophenone, p-dimethylaminobenzophenone, benzoin, benzoin allyl ether, benzoin methyl ether, benzoin ethyl ether, benzoin isobutyl ether, benzoin propyl ether, acetophenone, diethoxyacetophenone, 1-hydroxycyclohexyl phenyl ketone, benzyl dimethyl ketal, 2-hydroxy-2-methylpropiophenone, 1-(4-isopropylphenyl)-2-hydroxy-2-methylpropiophenone, 1-phenyl-1,2-propanedione-2-o-benzoyloxime; and thermal-polymerization initiators as exemplified by azo compounds such as azobisisobutyronitrile and dimethyl 2,2'-azobisisobutyrate, and peroxides such as benzoyl peroxide and di(t-butyl) peroxide.

In the first invention in the present application, it further provides an optic-purpose resin which is a cured product obtained by curing the above resin precursor composition of the first invention in the present application. The optic-purpose resin of the first invention in the present application may preferably have a post-curing d-line refractive index $n_d$ of less than 1.55 and have a difference of more than 0.010 which is found by subtracting a post-curing C-line refractive index $n_C$ from a post-curing F-line refractive index $n_F$.

In the first invention in the present application, it further provides an optical element comprising a first member formed of this optic-purpose resin of the first invention in the present application. The optical element of the first invention in the present application may be used as a lens, a diffraction grating or the like in still cameras, video cameras, eyeglasses, telescopes, binoculars, microscopes, pick-up lenses for optical disk/optical magnetic disk reading, and so forth. Accordingly, in the first invention in the present application, it also provides an optical article having the optical element of the first invention in the present application.

Figure 1:
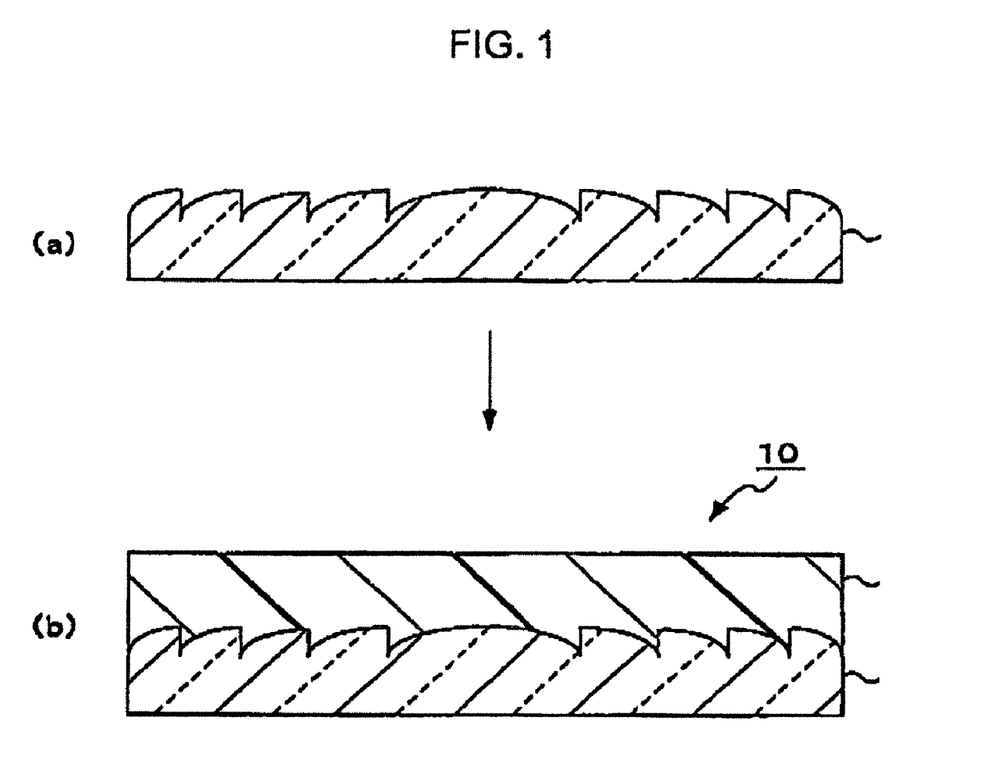
FIG. 1 is a sectional view of a close-contact double-layer type diffractive optical element in Example 1, where reference numeral 10 denotes the close-contact double-layer type diffractive optical element; 11, a first member formed of a low-refractive-index and high-dispersion optical material; and 11, a high-refractive-index and low-dispersion optical material.

Incidentally, the optic-purpose resin of the first invention in the present application may be used in, besides single lenses, composite optical elements such as resin cemented optical elements. In particular, it is suited for, as shown in FIG. 1 (b), a close-contact double-layer type diffractive optical element 10 comprising a first member 11 formed of an optical material having low refractive index and high dispersion and a second member 12 formed of a glass or resin having high refractive index and low dispersion.

Accordingly in the first invention in the present application, it provides an optical element comprising a first member formed of the optic-purpose resin of the first invention in the present application and a second member joined to the first member in close contact. Here, as the second member, an optical material may be used in which its d-line refractive index $n_{d2}$ is larger than a d-line refractive index $n_{d1}$ of the first member, and its dispersion (that is, a difference found by subtracting a C-line refractive index $n_{C2}$ of the second member from an F-line refractive index $n_{F2}$ of the second member) is smaller than a dispersion of the first member (that is, a difference found by subtracting a C-line refractive index $n_{C1}$ of the first member from an F-line refractive index $n_{F1}$ of the first member), whereby an element having especially useful optical characteristics can be obtained. Stated specifically, both the materials for the first and second members are made to have a large difference in refractive index. This makes the height of diffraction gratings small to make their production easy, and besides enables reduction of the angle dependence of diffraction efficiency. Making both the materials have a large difference in dispersion also enables reduction of the wavelength dependence of diffraction efficiency.

Incidentally, glass or resin may be used in this second member. It is preferable to use a glass having a glass transition temperature Tg lower than 400° C. Here, the glass includes sol-gel glass, inorganic glass and organic glass, which are transparent materials usually having a refractive index $n_d$ of from 1.4 to 2.0 and an Abbe constant of approximately from 20 to 100. As compositional components constituting the inorganic glass, they may include, e.g., $SiO_2$, $B_2O_3$, $P_2O_5$, $Na_2O$, $K_2O$, $CaO$, $BaO$, $MgO$, $ZnO$, $PbO$, $MnO$, $Al_2O_3$, $Fe_2O_3$, $Sb_2O_3$, $As_2O_3$, $TiO_2$, $La_2O_3$, $ZrO_2$ and $KHF_2$. Also, the organic glass may include polyacrylate, polymethacrylate, polyvinyl chloride, polyesters, celluloid, and cellulose derivatives.

There are no particular limitations on methods for molding the second member. For example, usable are a method in which the shape of a mold is transferred when the material is cured, an injection molding technique, and so forth. Further, in the case when the glass is used in the second member, usable are shape production by grinding, a method in which a shape is transferred while carrying out grinding by means of a form grinding wheel having a reverse lattice shape, and what is called glass mold technique, in which a shape is transferred by pressing a mold against a glass softened at a high temperature. Incidentally, in the case when the glass mold technique is used, it is difficult to work a heat-resistant mold because in diffraction gratings the shape to be transferred is complicate compared with usual aspheric lenses. However, a low-melting glass having a low glass transition temperature Tg may be used, whereby the range of selection can be broadened in respect of molds that can be used.

As a first resin favorable for the second invention in the present application, it may include alicyclic olefin resins, alicyclic acrylic resins, alicyclic polyurethane resins, resins having an episulfide structure, and epoxy-acrylate resins having an alicyclic structure. Of these, a single resin may be used, or two or more types of resins may be used in the form of a mixture. Incidentally, it is preferable for the first resin to contain a sulfur atom in the repeating unit, because optical characteristics can be more improved.

The alicyclic olefin resin favorable as the first resin may include a compound represented by the following general formula (17).

Here, $R^{31}$ and $R^{32}$ are each a monovalent or divalent organic group. In the case when $R^{31}$ and $R^{32}$ are each a divalent organic group, these combine with each other to form part of the cyclic structure. Also, n is an integer of 1 or more. The alicyclic olefin resin used in the second invention in the present application may preferably have a molecular weight of from 5,000 to 45,000.

In this alicyclic olefin resin of the formula (17), the properties of the resin change depending on the structure and combination of the substituents $R^{31}$ and $R^{32}$. Where $R^{31}$ and $R^{32}$ combine to constitute a ring structure to form a bulky atomic group, the resin comes colorless and transparent, and hence this is especially suited for the use in optical elements. Such a resin in which $R^{31}$ and $R^{32}$ constitute a ring structure may include a resin represented by any of the following structural formulas (18). Incidentally, m is an integer 0 or more.

-continued

The alicyclic olefin resin used in the second invention in the present application may consist of only one type of any of these repeating units, or may be a copolymer consisting of two or more repeating units.

This alicyclic olefin resin may further have a polar group in the molecule as in the following general formula (19). This is preferable because the resin can have a high affinity for inorganic materials or many polar organic materials and can be improved in formability.

(19)

Here, n is an integer of 1 or more. The alicyclic olefin resin used in the second invention in the present application may preferably have a molecular weight of from 5,000 to 45,000. $R^{33}$ is a polar group such as an acyl group or an acyloxy group. $R^{34}$ is an organic group such as a hydrogen atom or an alkyl group. Combination of $R^{33}$ and $R^{34}$ may include, e.g., ($R^{33}$/$R^{34}$)=(CO$_2$CH$_3$/H) (CO$_2$CH$_3$/CH$_3$), (CO$_2$C$_2$H$_5$/CH$_3$) and the like.

The alicyclic acrylic resin is a resin having an alicyclic structure in the side chain of acrylic resin. The alicyclic acrylic resin favorable for the first resin may include, e.g., a resin represented by the following general formula (20).

(20)

Here, $R^{35}$ is a hydrogen atom or an alkyl group (e.g., a methyl group). Also, $R^{36}$ is a cyclic aliphatic group, which may preferably be, e.g., a cycloalkyl group represented by any of the following structural formulas (21). Letter symbol p is an integer of 1 or more, and the alicyclic acrylic resin used in the second invention in the present application may preferably have a molecular weight of from 5,000 to 45,000.

(21)

These cyclic aliphatic groups may also each further have a substituent as shown in the following structural formula (22).

(22)

The alicyclic olefin resin used in the second invention in the present application may have as $R^{36}$ only any one type of these cyclic aliphatic groups, or may be a copolymer having two or more of these in the molecule. It may also be a copolymer further having in the molecule, in addition to the repeating unit represented by the formula (20), at least one of repeating units represented by the following formula (23). Here, $R^{37}$ is an ethyl group or a methyl group.

(23)

The alicyclic polyurethane resin favorable for the first resin may include, e.g., a polyurethane formed by the reaction of a diisocyanate compound having a cyclic structure with a polyol compound or a polythiol compound.

The diisocyanate compound having a cyclic structure may include a diisocyanate compound represented by the following general formula (24), isophorone diisocyanate, methylenebis(4-cyclohexylisocyanate), and hydrogenated xylilene diisocyanate. Any of these may be used alone, or may be used in combination of two or more types.

(24)

Here, $R^{39}$ and $R^{39}$ are each a hydrogen atom or a methyl group. Such a diisocyanate compound may include 4,4-dicyclohexylmethane diisocyanate and 4,4-isopropylidenebis(4-cyclohexylisocyanate).

Meanwhile, the polyol compound favorable for the second invention in the present application may include ethyleneglycol, propyleneglycol, neopentyl glycol, diethyleneglycol, dipropyleneglycol, hydrogenated bisphenol-A, 2,2'-di(4-hydroxypropoxyphenyl)propane, 1,3-butanediol, 1,4-butanediol, 1,5-pentanediol, 1,6-hexanediol, trimethyleneglycol, triethyleneglycol, and pentaerythritol diallyl ether. Also, the polythiol compound favorable for the second invention in the present application may include 1,2-bis[(2-mercaptoethyl)thio]-3-mercaptopropane represented by the following structural formula (25).

(25)

These polyols and polythiol, any one type may be used alone, or two or more types may be used in combination. Incidentally, the more the polythiol
is used, the higher the refractive index tends to be. Hence, such use is preferable.

The alicyclic polyurethane resin favorable for the first resin may also be a urethane acrylate or methacrylate made into acrylate or methacrylate by the reaction with an acrylate or methacrylate having a hydroxyl group. The acrylate or methacrylate having a hydroxyl group may include, e.g., 2-hydroxyethyl acrylate or methacrylate, hydroxypropyl acrylate or methacrylate, polyethyleneglycol acrylate or methacrylate, polypropyleneglycol monoacrylate or monomethacrylate, glycerol monoacrylate, and glycerol diacrylate.

The resin having an episulfide structure favorable for the first resin is an organic high-molecular compound having in the molecule at least one atomic group represented by the following structural formula (26).

(26)

Here, $R^{40}$ represents a hydrocarbon group having 1 to 10 carbon atoms; and $R^{41}$, $R^{42}$ and $R^{43}$ each represent a hydrogen atom or a hydrocarbon group having 1 to 10 carbon atoms.

X represents a sulfur atom or an oxygen atom. The number of sulfur atoms held in the total number of X groups contained in one molecule may preferably be 50% or more on the average.

This atomic group represented by the structural formula (26) may preferably be present in a number of two or more in the molecule. As compounds having a chainlike aliphatic skeleton in which this atomic group has combined in a number of two or more, favorable for the second invention in the present application are, e.g., bis(β-epithiopropylthio) methane, 1,2-bis(β-epithiopropylthio) ethane, 1,3-bis(β-epithiopropylthio) propane, 1,2-bis(β-epithiopropylthio) propane, 1-(β-epithiopropylthio)-2-(β-epithiopropylthiomethyl) propane, 1,4-bis(β-epithiopropylthio) butane, 1,3-bis(β-epithiopropylthio) butane, 1-(β-epithiopropyl thio)-3-(β-epithiopropylthiomethyl) butane, 1,5-bis(β-epithiopropylthio) pentane, 1-(β-epithiopropylthio)-4-(β-epithiopropylthiomethyl)pentane, 1,6-bis(β-epithiopropylthio)hexane, 1-(β-epithiopropylthio)-5-(3-epithiopropylthiomethyl)hexane, 1-(β-epithiopropylthio)-2-[(2-β-epithiopropylthioethyl)thio]ethane, and 1-(β-epithiopropylthio)-2-[(2-(2-β-epithiopropylthioethyl)thioethyl)thio]ethane. Compounds wherein at least one hydrogen atom of the episulfide group of any of these compounds has been substituted with a methyl group may also be included as compounds favorable for the second invention in the present application.

Further, as compounds having a cyclic aliphatic skeleton in which the atomic group represented by the structural formula (26) has combined in a number of two or more, favorable for the second invention in the present application are, e.g., cyclic aliphatic organic compounds such as 1,3-bis(β-epithiopropylthio)cyclohexane, 1,4-bis(β-epithiopropylthio)cyclohexane, 1,3-bis(β-epithiopropylthiomethyl)cyclohexane, 1,4-bis(β-epithiopropylthiomethyl)cyclohexane, bis[4-(β-epithiopropylthio)cyclohexyl]methane, 2,2-bis(4-β-epithiopropylthio)cyclohexyl)propane, bis[4-(β-epithiopropylthio)cyclohexyl]sulfide, 2,5-bis(β-epithiopropylthiomethyl)-1,4-dithian, and 2,5-bis(β-epithiopropylthioethylthiomethyl)-1,4-dithian.
Compounds wherein at least one hydrogen atom of the episulfide group of any of these compounds has been substituted with a methyl group may also be included as compounds favorable for the second invention in the present application.

The epoxy-acrylate resin having an alicyclic structure favorable as the first resin may include epoxy-acrylate resins having an alicyclic structure as exemplified by:

a cycloalkyl structure such as cyclopentane, cyclohexane or cyclooctane;

a hydrogenated cyclic structure formed by hydrogenation of (hydrogenating) an aromatic ring such as benzene, naphthalene, anthracene, pentalene, indene, azulene, heptalene, biphenylene, indacene, acenaphthylene, fluorene, phenanthrene, fluoranthene, acephenanthrylene, aceanthrylene, triphenylene, chrysene, pyrene, naphthacene, picene, perylene, pentaphene, pentacene, bisphenol A, bisphenol F, bisphenol S or phenol novolak resin;

a polycyclic structure such as tricyclodecane, bicycloheptane, norbornane, dicyclopentane, pinane or bornane;

a spiro structure such as spiro[3.4]octane or 2,4,8,10-tetraoxaspiro[5.5]undecane;

a heterocyclic structure such as oxorane, thiorane, silorane, dioxane or thioisatiane; and a hydrogenated heterocyclic structure such as thiazole, oxathiazine, dithiazien, furan, thiophene, pyrrole, oxazole, imidazole, pyran, pyridine, pyrroline, piperidine, piperadine, morpholine, indole, quinoline, xanthene, carbazole, acridine, indoline and coumarone. In particular, those containing a phenolic hydroxyl group in starting materials are preferred because they afford a good yield and improve the purity of epoxy-acrylate.

Incidentally, in the case when the epoxy-acrylate resin having an alicyclic structure is synthesized from the compound having a saturated cyclic structure, the compound having a saturated cyclic structure may be made into glycidyl ether using epichlorohydrin or glycidol, which is then allowed to react with a compound having a polymerizable unsaturated group and a carboxyl group at a terminal, such as acrylic acid or methacrylic acid, to synthesize a compound as represented by the following structural formula (27), and this may be polymerized. Here, in the formula (27), $R^{44}$ is a divalent organic group (preferably a hydrocarbon group).

(27)

In the case when the substance having a phenolic hydroxyl group is used as a starting material, the starting material may be made into glycidyl ether using epichlorohydrin, which is thereafter hydrogenated to have a saturated cyclic structure, and this is allowed to react with a compound having a polymerizable unsaturated group and a carboxyl group at a terminal, such as acrylic acid or methacrylic acid, to synthesize a compound as represented by the following structural formula (28), and this may be polymerized. Here, q is an integer of 1 or more.

In the formula (29), $R^{45}$ and $R^{46}$ are each a hydrogen atom, a methyl group or a trifluoromethyl group, $R^{47}$ and $R^{48}$ are each $-(OCH_2CH_2)_a-(OCH_2CH_2CH_2)_b-$. Herein, a and b are each an integer of 0 or 1 or more.

This compound represented by the formula (29) may include, e.g.;

EO modified bisphenol-A diacrylate ($R^{45}$ is a hydrogen atom, $R^{46}$ is a methyl group, $R^{47}$ is $-(OCH_2CH_2)_{f1}-$, $R^{48}$ is $-(OCH_2CH_2)_{g1}-$, where f1 and g1 are each an integer of 1 or more and may preferably be 30 or less);

(28)

The second resin may preferably not contain any of a sulfur atom, a chlorine atom, a bromine atom and an iodine atom in the molecule. The second resin may also preferably be an ultraviolet-curable resin because it may be formed without heating at a high temperature.

As examples of a resin containing fluorine, favorable as the second resin used in the second invention in the present application, it may include 2,2,2-trifluoroethyl methacrylate, 2,2,2-trifluoroethyl acrylate, β-(perfluoroethyl)ethyl methacrylate, β-(perfluoroethyl)ethyl acrylate, 1,1,1,3,3,3-hexafluoroisopropyl methacrylate, 1,1,1,3,3,3-hexafluoroisopropyl acrylate, 2,2,2-trifluoroethyl methacrylate, 2,2,2-trifluoroethyl acrylate, 2,2,3,3-tetrafluoropropyl methacrylate, 2,2,3,3-tetrafluoropropyl methacrylate, 2,2,3,4,4,4-hexafluorobutyl methacrylate, 2, 2, 3, 4,4,4-hexafluorobutylmethacrylate, octafluoropentyl methacrylate and octafluoropentyl acrylate.

As examples of a resin containing a benzene ring, favorable as the second resin used in the second invention in the present application, it may include a compound represented by any of the following general formulas (29) to (31), and those obtained by polymerizing 2-hydroxy-3-phenoxypropyl acrylate or methacrylate, phenoxyethyl acrylate or methacrylate, phenoxydiethyleneglycol acrylate or methacrylate, benzyl acrylate or methacrylate, p-cumylphenoxyethyleneglycol acrylate or methacrylate or the like.

EO modified bisphenol-A dimethacrylate ($R^{45}$ is a methyl group, $R^{46}$ is a methyl group, $R^{47}$ is $-(OCH_2CH_2)_{f1}-$, $R^{48}$ is $-(OCH_2CH_2)_{g1}-$, where f1 and g1 are each an integer of 1 or more and may preferably be 30 or less);

PO modified bisphenol-A diacrylate ($R^{45}$ is a hydrogen atom, $R^{46}$ is a methyl group, $R^{47}$ is $-(OCH_2CH_2CH_2)_{f1}-$, $R^{48}$ is $-(OCH_2CH_2CH_2)_{g1}-$, where f1 and g1 are each an integer of 1 or more and may preferably be 30 or less);

PO modified bisphenol-A dimethacrylate ($R^{45}$ is a methyl group, $R^{46}$ is a methyl group, $R^{47}$ is $-(OCH_2CH_2CH_2)_{f1}-$, $R^{48}$ is $-(OCH_2CH_2CH_2)_{g1}-$, where f1 and g1 are each an integer of 1 or more and may preferably be 30 or less);

EO modified bisphenol-F diacrylate ($R^{45}$ is a hydrogen atom, $R^{46}$ is $-CF3$, $R^{47}$ is $-(OCH_2CH_2)_{f1}-$, $R^{48}$ is $-(OCH_2CH_2)_{g1}-$, where f1 and g1 are each an integer of 1 or more and may preferably be 30 or less);

EO modified bisphenol-F dimethacrylate ($R^{45}$ is a methyl group, $R^{46}$ is a hydrogen atom, $R^{47}$ is $-(OCH_2CH_2)_{f1}-$, $R^{48}$ is $-(OCH_2CH_2)_{g1}-$, where f1 and g1 are each an integer of 1 or more and may preferably be 30 or less);

PO modified bisphenol-F diacrylate ($R^{45}$ is a hydrogen atom, $R^{46}$ is a hydrogen atom, $R^{47}$ is $-(OCH_2CH_2CH_2)_{f1}-$, $R^{48}$ is $-(OCH_2CH_2CH_2)_{g1}-$, where f1 and g1 are each an integer of 1 or more and may preferably be 30 or less);

PO modified bisphenol-F diacrylate ($R^{45}$ is a methyl group, $R^{46}$ is a hydrogen atom, $R^{47}$ is $-(OCH_2CH_2CH_2)_{f1}-$, $R^{48}$ (29)

(30)

(31)

is —(OCH₂CH₂CH₂)$_{g1}$—, where f1 and g1 are each an integer of 1 or more and may preferably be 30 or less);

EO, PO modified bisphenol-A acrylate (R$^{45}$ is a hydrogen atom, R$^{46}$ is a methyl group, R$^{47}$ is —(OC₂H₄)$_{f1}$—, (OC₃H₆)$_{g1}$—, R$^{48}$ is —(OC₂H₄)$_{h1}$—(OC₃H₆)$_{i1}$—, where f1, g1, h1 and i1 are each an integer of 1 or more and may preferably be 30 or less); and EO, PO modified bisphenol-A methacrylate (R$^{45}$ is a methyl group, R$^{46}$ is a methyl group, R$^{47}$ is —(OC₂H₄)$_{f1}$—, (OC₃H₆)$_{g1}$—, R$^{48}$ is —(OC₂H₄)$_{h1}$—(OC₃H₆)$_{i1}$—, where f1, g1, h1 and i1 are each an integer of 1 or more and may preferably be 30 or less).

In the formula (30), Z is a divalent group represented by any of the following structural formulas (32), and r and t are each an integer of 1 or more and may preferably be 10 or less.

This compound represented by the formula (30) may include, e.g., 2-propenic acid 5,5'-[9H-fluoren-9-ylidene]bis[(1,1'-biphenyl)-2-poly(oxy-2,1-ethanediyl)]ester, 2-propenic acid 5,5'-[4-(1,1'-biphenyl)methylene]bis[(1,1'-biphenyl)-2-poly(oxy-2,1-ethanediyl)]ester, and 2-propenic acid [(1-phenylethylidene)bis[(4,1-phenylenepoly(oxy-2,1-ethanediyl)]ester.

The compound represented by the formula (31) may also include 2-propenic acid 1-[4-(1-(4-phenyleneoxyethyl)-1-methylethyl)phenyl]ethylidenebis(4-phenyleneoxyethyl) ester.

As examples of a resin containing both a fluorine atom and a benzene ring, favorable as the second resin used in the second invention in the present application, it may include resins obtained by allowing a diol represented by any of the following structural formulas (33) to react with acrylate or methacrylate. These resins may be subjected to ethylene oxide (i.e., EO) modification or propylene oxide (i.e., PO) modification.

(33)

Of these compounds favorable as the second resin, only one type may be used, or two or more types may also be used in combination. A copolymer of any of these may also be used.

In the second invention in the present application, it is preferable that the second member has a d-line refractive index $n_{d1}$ of 1.45 or more and the second member has an average dispersion MD₁ of 0.02 or less. It is also preferable that the first member has a d-line refractive index $n_{d1}$ of 1.60 or less and the first member has an average dispersion MD₂ of 0.01 or more.

Accordingly, the present invention provides an optical material having a d-line refractive index $n_d$ of 1.60 or less and an average dispersion MD of 0.01 or more; the d-line refractive index $n_d$ and the average dispersion MD being in the relationship of $$n_d \leq 8.8 \times MD + 1.402; \text{ and}$$

comprising organic matter only, and provides an optical element comprising the first member comprising the optical material.

It is further preferable that a difference found by subtracting the d-Line refractive index $n_{d2}$ of the first member from the d-line refractive index $n_{d1}$ of the second member is 0.03 or more and a difference found by subtracting the average dispersion MD₂ of the first member from the average dispersion MD₁ of the second member is −0.003 or less.

Thus, resins having a large difference in refractive index are used in the first and second members. This makes the height of diffraction gratings small to make their production easy, and besides enables reduction of the angle dependence of diffraction efficiency. Also, resins having a large difference in average dispersion are used in the first and second members. This enables reduction of the wavelength dependence of diffraction efficiency.

There are no particular limitations on methods for molding the first and second members. For example, usable are a method in which the shape of a mold is transferred when the material is cured, an injection molding technique, and so forth. Also, as methods for the curing, the material may be cured by heating, or by leaving to cool, depending on the types of resins used, or may be cured by exposure.

Of the first member and the second member, in respect of the member to be formed later, the material may preferably be cured by exposure using an ultraviolet-curable resin, which can be cured without heating, in order that the member having already been molded can be prevented from its deformation and change of properties.

In the second invention in the present application, both the first member and the second member are formed of the resin, and hence the resin can well be put full in grooves of molds because it is molded in an uncured or softened low-viscosity state, so that good transfer can be achieved.

It may also be molded at a temperature lower than the glass, and hence materials for molds can be selected in a wide range.

Hence, according to the second invention in the present application, a high-precision close-contact double-layer type diffractive optical element can be produced at a low cost. Incidentally, there are no particular limitations on materials for the base material, which may as well be resin or glass.

The optical element of the second invention in the present application may be used in optical systems such as still cameras, video cameras, telescopes, binoculars and microscopes, and in pick-up lenses for optical disk/optical magnetic disk reading. Accordingly, in the second invention in the present application, it also provides an optical article having the optical element of the second invention in the present application.

EXAMPLES

Example 1

A. Preparation of Resin Precursor Composition (1) Resin Precursor Composition I

Using as a first resin precursor 2,2,2-trifluoroethyl methacrylate ($n_d$=1.3605, $n_F$–$n_C$=0.0075), a compound represented by the formula (3), and using as a second resin precursor ethylene oxide modified bisphenol-A dimethacrylate ($n_d$=1.5425, $n_F$–$n_C$=0.0164), a compound represented by the formula (10) where $R^{20}$ and $R^{22}$ are methyl groups, $R^{21}$ is —(OCH$_2$CH$_2$)$_{w1}$—, $R^{23}$ is —(OCH$_2$CH$_2$)$_{w2}$—, and w1+w2=2.2, the first resin precursor and the second resin precursor were mixed in a volume ratio of 1:9, and thoroughly stirred to prepare Resin Precursor Composition I. Resin Precursor Composition I obtained had optical constants of a refractive index $n_d$ of 1.5243 and a dispersion ($n_F$–$n_C$) of 0.0155.

(2) Resin Precursor Composition II

Using as a first resin precursor 1,3-butyleneglycol diacrylate ($n_d$=1.4500, $n_F$–$n_C$=0.0093), a compound represented by the formula (4), and using as a second resin precursor ethylene oxide modified bisphenol-A dimethacrylate ($n_d$=1.5322, $n_F$–$n_C$=0.0152) a compound represented by the formula (10) where $R^{20}$ and $R^{22}$ are methyl groups, $R^{21}$ is —(OCH$_2$CH$_2$)$_{w1}$—, $R^{23}$ is —(OCH$_2$CH$_2$)$_{w2}$—, and w1+w2=4, the first resin precursor and the second resin precursor were mixed in a volume ratio of 3:7, and thoroughly stirred to prepare Resin Precursor Composition II. Resin Precursor Composition II obtained had optical constants of a refractive index $n_d$ of 1.5075 and a dispersion ($n_F$–$n_C$) of 0.0134.

(3) Resin Precursor Composition III

Using as a first resin precursor dimethylaminoethyl methacrylate ($n_d$=1.4391, $n_F$–$n_C$=0.0093), a compound represented by the formula (5), and using as a second resin precursor [5,5'-(9H-fluoren-9-ylidene)bis{(1,1-biphenyl)-2-poly(oxy-2,1-ethanediyl)}]2-propenoate ($n_d$=1.610, $n_F$–$n_C$=0.0169) a compound represented by the formula (11), the first resin precursor and the second resin precursor were mixed in a volume ratio of 5:5, and thoroughly stirred to prepare Resin Precursor Composition III. Resin Precursor Composition III obtained had optical constants of a refractive index $n_d$ of 1.5245 and a dispersion ($n_F$–$n_C$) of 0.0131.

(4) Resin Precursor Composition IV

Using as a first resin precursor propylene oxide modified neopentyl glycol diacrylate ($n_d$=1.446, $n_F$–$n_C$=0.0098), a compound represented by the formula (6) where $R^7$ is a hydrogen atom, $R^8$ is —$C_5H_{10}$—, d and f are 3, and e and g are 1, and using as a second resin precursor ethylene oxide modified bisphenol-A dimethacrylate ($n_d$=1.5425, $n_F$–$n_C$=0.0164), a compound represented by the formula (10) where $R^{20}$ and $R^{22}$ are methyl groups, $R^{21}$ is —(OCH$_2$CH$_2$)$_{w1}$—, $R^{23}$ is —(OCH$_2$CH$_2$)$_{w2}$—, and w1+w2=2.2, the first resin precursor and the second resin precursor were mixed in a volume ratio of 5:5, and thoroughly stirred to prepare Resin Precursor Composition IV. Resin Precursor Composition IV obtained had optical constants of a refractive index $n_d$ of 1.4943 and a dispersion ($n_F$–$n_C$) of 0.0131.

(5) Resin Precursor Composition V

Using as a first resin precursor tris(acryloxyethyl) isocyanurate ($n_d$=1.4520, $n_F$–$n_C$=0.0092), a compound represented by the formula (7) where $R^9$ to $R^{11}$ are all CH$_2$CH$_2$OCOCH=CH$_2$, and using as a second resin precursor ethylene oxide modified bisphenol-A dimethacrylate ($n_d$=1.5322, $n_F$–$n_C$=0.0152), a compound represented by the formula (10) where $R^{20}$ and $R^{22}$ are methyl groups, $R^{21}$ is —(OCH$_2$CH$_2$)$_{w1}$—, $R^{23}$ is —(OCH$_2$CH$_2$)$_{w2}$—, and w1+w2=4, the first resin precursor and the second resin precursor were mixed in a volume ratio of 4:6, and thoroughly stirred to prepare Resin Precursor Composition V. Resin Precursor Composition V obtained had optical constants of a refractive index $n_d$ of 1.5001 and a dispersion ($n_F$–$n_C$) of 0.0128.

(6) Resin Precursor Composition VI

Using as a first resin precursor ethylene oxide modified glycerol triacrylate ($n_d$=1.4750, $n_F$–$n_C$=0.0086), a compound represented by the formula (8) where $R^{12}$ and $R^{13}$ are hydrogen atoms, and $R^{13}$, $R^{14}$ and $R^{16}$ are each —$C_5H_{10}$—, and using as a second resin precursor ethylene oxide modified bisphenol-A dimethacrylate ($n_d$=1.5322, $n_F$–$n_C$=0.0152), a compound represented by the formula (10) where $R^{20}$ and $R^{22}$ are methyl groups; $R^{21}$ is —(OCH$_2$CH$_2$)$_{w1}$—, $R^{23}$ is —(OCH$_2$CH$_2$)$_{w2}$—, and w1+w2=4, the first resin precursor and the second resin precursor were mixed in a volume ratio of 5:5, and thoroughly stirred to prepare Resin Precursor Composition VI. Resin Precursor Composition VI obtained had optical constants of a refractive index $n_d$ of 1.5036 and a dispersion ($n_F$–$n_C$) of 0.0119.

(7) Resin Precursor Composition VII

Using as a first resin precursor pentaerythritol triacrylate ($n_d$=1.4822, $n_F$–$n_C$=0.0093), a compound represented by the formula (9), and using as a second resin precursor ethylene oxide modified bisphenol-A dimethacrylate ($n_d$=1.5425, $n_F-n_C$=0.0164), a compound represented by the formula (10) where $R^{20}$ and $R^{22}$ are methyl groups, $R^{21}$ is —(OCH$_2$CH$_2$)$_{w1}$—, $R^{23}$ is —(OCH$_2$CH$_2$)$_{w2}$—, and w1+w2=2.2, the first resin precursor and the second resin precursor were mixed in a volume ratio of 7:3, and thoroughly stirred to prepare Resin Precursor Composition VII. Resin Precursor Composition VII obtained had optical constants of a refractive index $n_d$ of 1.5003 and a dispersion ($n_F-n_C$) of 0.0114.

(8) Resin Precursor Composition VIII

Using as a first resin precursor dipentaerythritol hydroxypentaacrylate ($n_d$=1.4855, $n_F-n_C$=0.0089), a compound represented by the formula (9), and using as a second resin precursor ethylene oxide modified bisphenol-A dimethacrylate ($n_d$=1.5425, $n_F-n_C$=0.0164), a compound represented by the formula (10) where $R^{20}$ and $R^{22}$ are methyl groups, $R^{21}$ is —(OCH$_2$CH$_2$)$_{w1}$—, $R^{23}$ is —(OCH$_2$CH$_2$)$_{w2}$—, and w1+w2=2.2, the first resin precursor and the second resin precursor were mixed in a volume ratio of 7:3, and thoroughly stirred to prepare Resin Precursor Composition VIII. Resin Precursor Composition VIII obtained had optical constants of a refractive index $n_d$ of 1.5026 and a dispersion ($n_F-n_C$) of 0.0112.

(9) Resin Precursor Composition IX

Using as a first resin precursor 2,2,2-trifluoroethyl methacrylate ($n_d$=1.36.5, $n_F-n_C$=0.0075), a compound represented by the formula (9), and using as a second resin precursor 1,1-bis(p-acryloyloxyethyloxyphenyl)-1-[p'-(1'-(p'-acryloyloxyethyloxy)phenyl-1'-methylethyl)phenyl]ethane, the first resin precursor and the second resin precursor were mixed in a volume ratio of 3:7, and thoroughly stirred to prepare Resin Precursor Composition IX. Resin Precursor Composition IX obtained had optical constants of a refractive index $n_d$ of 1.5121 and a dispersion ($n_F-n_C$) of 0.0143.

B. Preparation of Optic-purpose Resin (1) Photosetting Resin

In Resin Precursor Compositions I to V, 1% by weight each of 1-hydroxycyclohexyl phenyl ketone was dissolved as a photopolymerization initiator, and these were thoroughly stirred. Next, the resultant resin precursor compositions were casted into a matrix made by putting glass sheets together, followed by irradiation with ultraviolet rays of a high-pressure mercury lamp for 2 minutes. Optical constants of the transparent cured products thus obtained were measured to obtain the results shown in Table 1.

TABLE 1

| Resin Precursor Composition | $n_d$ | $n_F-n_c$ | Gel percentage (%) |
|---|---|---|---|
| I | 1.5440 | 0.0153 | 97 |
| II | 1.5285 | 0.0131 | 98 |
| III | 1.5451 | 0.0127 | 98 |
| IV | 1.5133 | 0.0128 | 97 |
| V | 1.5251 | 0.0125 | 97 |

Incidentally, the gel percentage was determined in the following way. First, about 0.5 g of the resin cured product was dried in a desiccator for about a day, and thereafter its mass (represented by a) was precisely measured. Next, the resin having been dried was immersed in 70° C. methyl ethyl ketone for about 6 hours while changing the methyl ethyl ketone for new one at intervals of 2 hours, and thereafter this was left in the desiccator for a day. Subsequently, the resin was dried at 100° C. for 2 hours, and then further left in the desiccator for 1 hour to cool to room temperature.

Thereafter, its mass (represented by b) was precisely measured, and the gel percentage was calculated according to:

Gel percentage=($b/a$)×100(%).

It is considered that the deterioration of weatherability of resins is caused by unreacted functional groups remaining also after molding, which cause various side reactions such as coloring of resins over a long period of time. Resins having a higher gel percentage are considered to have fewer unreacted functional groups, and hence have superior weatherability. In fact, weatherability having no problem in practical use is achievable in resins having a gel percentage of 95% or more. In those having a gel percentage of 96% or more, especially superior weatherability is achievable.

(2) Thermosetting Resin

In Resin Precursor Compositions VI to IX, 0.3% by weight each of azobisisobutylonitrile was dissolved as a thermal-polymerization initiator, and these were thoroughly stirred. Next, the resultant resin precursor compositions were casted into the same matrix as that in the above case of photosetting, and thereafter put into an oven, where the temperature was raised from room temperature to 60° C. over a period of 5 hours, thereafter raised to 80° C. over a period of 3 hours, and further raised to 100° C. over a period of 2 hours. At 100° C., the compositions were further heated for 1 hour, followed by cooling, and then mold release to obtain colorless transparent cured products. Optical constants of the transparent cured products thus obtained were measured to obtain the results shown in Table 2.

TABLE 2

| Resin Precursor Composition | $n_d$ | $n_F-n_c$ | Gel percentage (%) |
|---|---|---|---|
| VI | 1.5286 | 0.0115 | 98 |
| VII | 1.5219 | 0.0111 | 98 |
| VIII | 1.5263 | 0.0110 | 98 |
| IX | 1.5341 | 0.0141 | 98 |

C. Production of Optical Element (1) Molding of Second Member

Molding low-melting glass P-SK60 ($n_d$=1.59087, $n_F-n_C$=0.00948), available from SUMITA Optical Glass, Inc., was molded by glass molding to transfer a lattice shape to the surface to produce a second member 12 shown in FIG. 1 (a).

Incidentally, the molding was carried out at a temperature of 440° C., keeping the atmosphere in vacuum during heating.

Also, a mold was produced using a mold base made of stainless steel on which Ni—P plating was applied, where the plating layer formed was worked by cutting to form a shape reverse to that shown in FIG. 1. As a cutting tool, a cutting tool whose tip curvature was 2 μm was used. In the second member shown in FIG. 1 (a), it was in an outer diameter of 60 mm, a lattice height of 12.5 μm, and a lattice pitch of about 2 mm at the center and its vicinity and about 120 μm on the periphery, setting pitches smaller as lattices come up to the periphery.

(2) Molding of First Member

To the first resin precursor composition, 1% by weight each of 1-hydroxycyclohexyl phenyl ketone was added as a photopolymerization initiator, and these were thoroughly stirred. The resin precursor composition obtained was dropped to the lattice-molded surface of the above second member 12 with lattices formed by molding, and then a mold was put close thereto from above to make the resin held full between the mold and the glass. Next, this was irradiated with ultraviolet rays by a high-pressure mercury lamp on the side of the second member, and thereafter the mold was released to shape the first member. Thus, a composite optical element 10 shown in FIG. 1 (b) was produced, having a lattice shape at its joint.

Example 2

Figure 2:
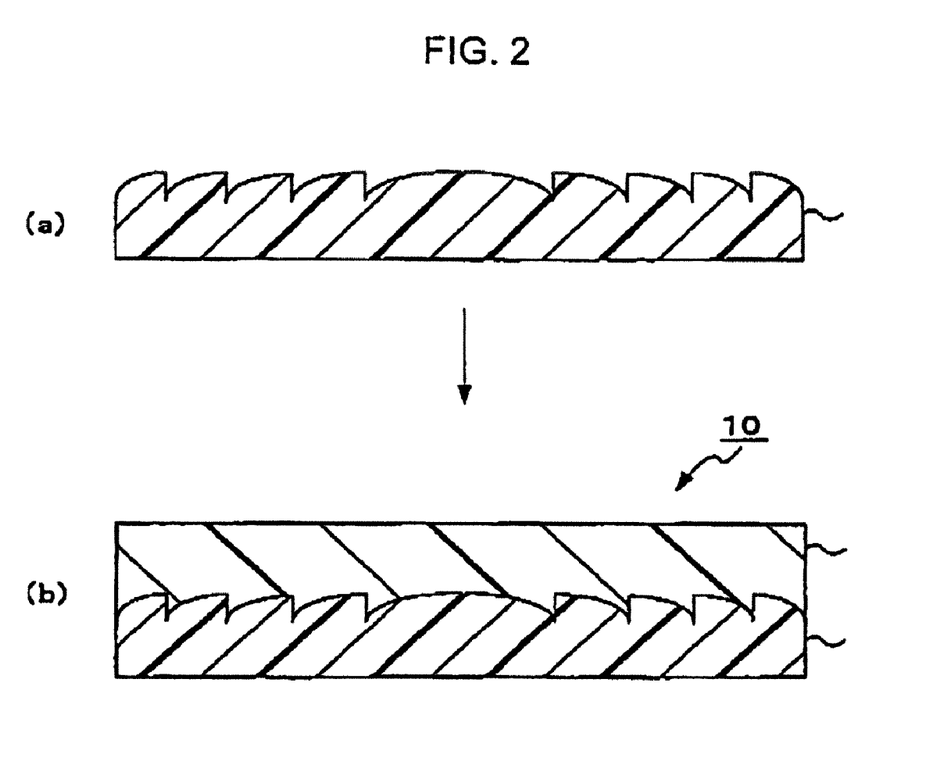
FIG. 2 is a sectional view showing a process of producing a close-contact double-layer type diffractive optical element in Example 2.

First, a cyclic olefin resin (ZEONEX, available from Nippon Zeon Co., Ltd.) having a repeating unit represented by the following structural formula (34) was injection-molded to form a second member 12 shown in FIG. 2 (a). Incidentally, in carrying out the molding, the cylinder temperature was set to 210° C., and the mold temperature to 100° C.

(34)

Subsequently, 58% by weight of 2,2,2-trifluoroethyl methacrylate represented by the following structural formula (35), 41.5% by weight of 2-propenic acid 5,5'-(9H-fluoren-9-ylidene)bis[(1,1'-biphenyl)-2-poly(oxy-2,1-ethanediyl)]ester represented by the following structural formula (36) and 0.5% by weight of a photopolymerization initiator (IRGACURE 184, available from Ciba Specialty Chemicals Co.) were mixed to prepare an ultraviolet-curable resin composition.

(35)

(36)

(wherein x is an integer of 1 or more).

This ultraviolet-curable resin composition was dropped to the lattice-molded surface of the above second member 12, and then a mold was put close thereto from above to make the resin held full between the mold and the first member.

Thereafter, this was irradiated with ultraviolet rays by a high-pressure mercury lamp on the side of the second member 12 to effect curing, and the mold was released. Thus, a first member 11 shown in FIG. 2 (b) was formed.

In this way, a close-contact double-layer type diffractive optical element 10 was obtained. Incidentally, the element obtained was in an outer diameter of 60 mm, a lattice height of 20 μm, and a lattice pitch of about 2 mm at the center and its vicinity and about 120 μm do the periphery, setting pitches smaller as lattices came up to the periphery.

The diffractive optical element 10 obtained according to this Example had the stated optical characteristics in a good precision. This was used in an optical system to manufacture a camera. As a result, the camera obtained was able to photograph to obtain good images that are free of blur because of the correction of chromatic aberration by the use of this diffractive optical element.

The refractive indexes $n_{d1}$ and $n_{d2}$, average dispersions $MD_1$, and $MD_2$ and their differences $n_{d1}-n_{d2}$ and $MD_1-MD_2$ of the resin used in each lattice member in this Example are each shown in Table 3,

TABLE 3

|  |  | $n_d$ | MD |
|---|---|---|---|
| Example 2 | First member | 1.500 | 0.0129 |
|  | Second member | 1.530 | 0.0098 |
|  | Difference | 0.030 | 0.0031 |
| Example 3 | First member | 1.545 | 0.0172 |
|  | Second member | 1.594 | 0.0142 |
|  | Difference | 0.050 | 0.0030 |

Example 3

First, 0.3 mol of dicyclohexylmethane-4,4'-diisocyanate, 0.2 mol of 1,2-bis[(2-mercaptoethyl)thio]-3-mercaptopropane and 0.3% by weight (based on the whole resin) of dibutyltin dilaurate were so mixed as to come uniform to prepare a cyclic thiourethane resin.

Figure 3:
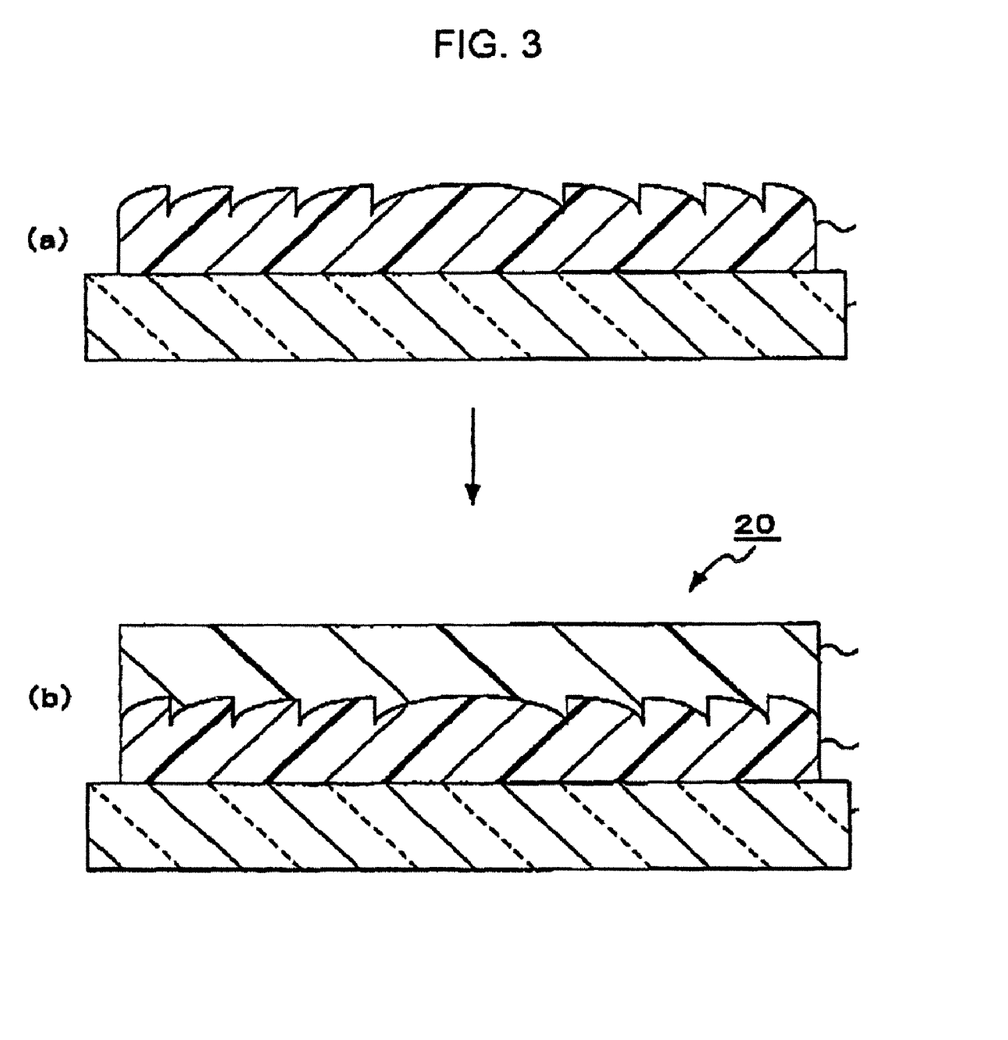
FIG. 3 is a sectional view showing a process of producing a close-contact double-layer type diffractive optical element in Example 3, where reference numeral 10 denotes the close-contact-double-layer type diffractive optical element; 21, a first member; 22, a second member; and 23, a base material.

The cyclic thiourethane resin obtained was made held full between a base material 13 formed of an optical glass and a mold having a molding surface and coated with a release agent on the molding surface, followed by heating at 130° C. for 2 hours to effect curing, and thereafter the mold was released. Thus, as shown in FIG. 3 (a), a second member 12 was formed on the surface of the base material 23.

Subsequently, 49.5% by weight of benzyl methacrylate, 20% by weight of 2-propenic acid 5,5'-{4-(1,1'-biphenyl)methylene}bis[(1,1'-biphenyl)-2-poly(oxy-2,1-ethanediyl)] ester represented by the following structural formula (37), 30% by weight of bisphenol-AF dimethacrylate represented by the following structural formula (38) and 0.5% by weight of a photopolymerization initiator (IRGACURE 184, available from Ciba Specialty Chemicals Co.) were mixed to prepare an ultraviolet-curable resin composition.

(wherein y is an integer of 1 or more).

This ultraviolet-curable resin composition was dropped to the lattice-molded surface of the second member 21, and then a mold was put close thereto from above to make the resin held full between the mold and the first member. Thereafter, this was irradiated with ultraviolet rays by a high-pressure mercury lamp on the side of the second member 21 to effect curing, and the mold was released. Thus, a first member 22 shown in FIG. 3 (*b*) was molded.

In this way, a close-contact double-layer type diffractive optical element 20 was obtained. Incidentally, the element obtained was in an outer diameter of 60 mm, a lattice height of 12 μm, and a lattice pitch of about 2 mm at the center and its vicinity and about 120 μm on the periphery, setting pitches smaller as lattices came up to the periphery.

The diffractive optical element 20 obtained according to this Example had the stated optical characteristics in a good precision. This was used in an optical system to manufacture a camera. As a result, the camera obtained was able to photograph to obtain good images that are free of blur because of the correction of chromatic aberration by the use of this diffractive optical element.

The refractive indexes $n_{d1}$ and $n_{d2}$, average dispersions $MD_1$ and $MD_12$ and their differences $n_{d1}-n_{d2}$ and $MD_1-MD_12$ of the resin used in each lattice member in this Example are each shown in Table 3.

POSSIBILITY OF INDUSTRIAL APPLICATION

As described above, according to the present invention, optical elements having superior optical characteristics can be produced. In particular, close-contact double-layer type diffractive optical elements can be produced at a low cost and with ease.

What is claimed is:

1. An optic-purpose resin obtained by curing a mixture of
at least a first resin precursor having d-line refractive index $n_d < 1.50$ and $0.003 < $(F-line refractive index $n_F$-C-line refractive index $n_C$) in an uncured state, and
a second resin precursor having d-line refractive index $n_d < 1.62$ and $0.010 < $(F-line refractive index $n_F$-C-line refractive index $n_C$) in an uncured state;

said first resin precursor not containing any of a benzene ring, a sulfur atom, a chlorine atom, a bromine atom and an iodine atom, having at least one of any of an acrylic group, a methacrylic group and a vinyl group; and
said second resin precursor not containing any of a sulfur atom and a halogen atom, and having at least one of any of an acrylic group, a methacrylic group and a vinyl group.

2. An optic-purpose resin obtained by curing a mixture of
at least a first resin precursor having d-line refractive index $n_d < 1.50$ and $0.003 < $(F-line refractive index $n_F$-C-line refractive index $n_C$) in an uncured state, and
a second resin precursor having d-line refractive index $n_d < 1.62$ and $0.010 < $(F-line refractive index $n_F$-C-line refractive index $n_C$) in an uncured state;
said first resin precursor being represented by the following compositional formula (1) and having at least one polymerizable functional group in the molecule;

$$C_{m1}H_{n1}O_{p1}N_{q1}F_{r1} \tag{1}$$

wherein
m1 and n1 are each an integer of 5 or more;
p1 and q1 are each an integer of 0 or 1 or more and m1 or less; and
r1 is an integer of 0 or 1 or more and (n1×2) or less; and
said second resin precursor being represented by the following compositional formula (2) and having at least one polymerizable functional group in the molecule and at least one benzene ring in the molecule;

$$C_sH_tO_uN_v \tag{2}$$

wherein
s and t are each an integer of 5 or more, and
u and v are each an integer of 0 or 1 or more and s or less.

3. The optic-purpose resin according to claim 1 or 2, which has d-line refractive index $n_d < 1.55$ and (F-line refractive index $n_F$-C-line refractive index $n_C$)>0.010.

4. An optical element comprising a first member comprising the resin according to claim 1 or 2.

5. The optical element according to claim 4, which further comprises
a second member joined to said first member in close contact;
a d-line refractive index $n_{d2}$ of said second member being larger than a d-line refractive index $n_{d1}$ of said first member, and a difference found by subtracting a C-line refractive index $n_{C2}$ of said second member from an F-line refractive index $n_{F2}$ of said second member being smaller than a difference found by subtracting a C-line refractive index $n_{C1}$ of said first member from an F-line refractive index $n_{F1}$ of said first member.

6. The optical element according to claim 5, wherein said second member is a glass having a glass transition temperature lower than 400° C.

7. A close-contact double-layer type diffractive optical element comprising a second member formed of a first resin and a first member formed of a second resin, joined to the second member in close contact;

a d-line refractive index $n_{d1}$ of said second member being larger than a d-line refractive index $n_{d2}$ of said first member;

an average dispersion $MD_1$ of said second member which is found by subtracting a C-line refractive index $n_{C1}$ from an F-line refractive index $n_{F1}$ of said second member being smaller than an average dispersion $MD_2$ of said first member which is found by subtracting a C-line refractive index $n_{C2}$ from an F-line refractive index $n_{F2}$ of said first member;

and said first resin having an alicyclic structure in the repeating unit, and said second resin is the optic purpose resin according to claim 1 or 2.

8. An optical article comprising the optical element according to claim 4.

* * * * *